July 6, 1926.

R. D. MAILEY

JOINTURE MEANS

Filed Dec. 7, 1923

INVENTOR
Roy D. Mailey
BY
ATTORNEY

July 6, 1926. 1,591,174
R. D. MAILEY
JOINTURE MEANS
Filed Dec. 7, 1923 2 Sheets-Sheet 2
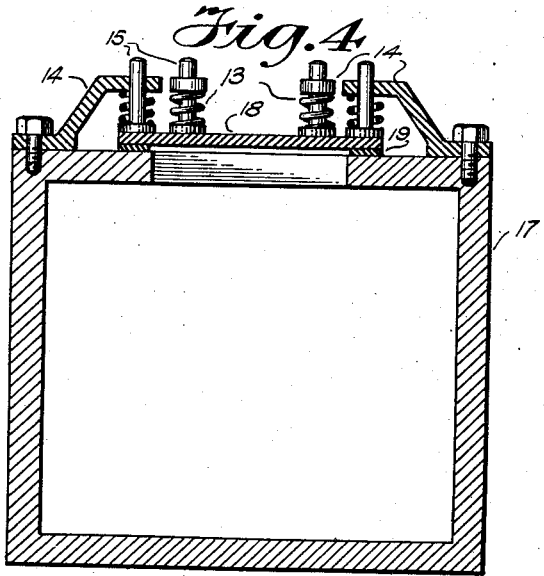
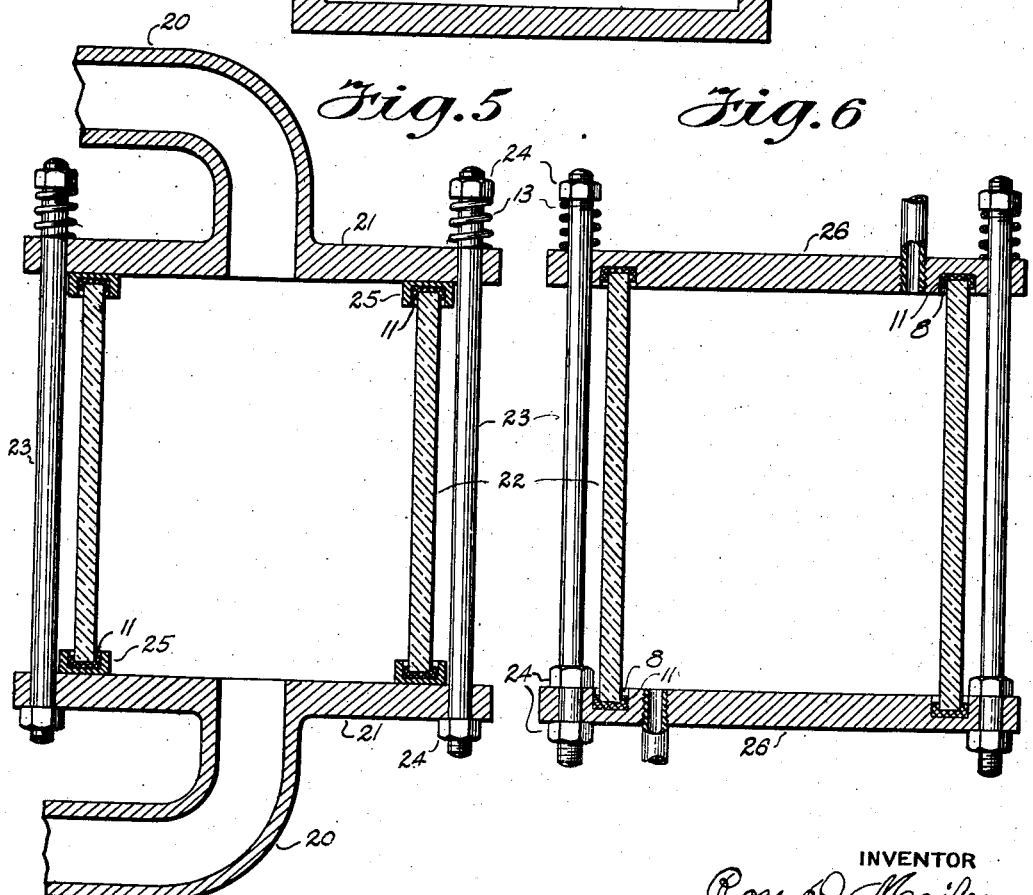
INVENTOR
Roy D. Mailey
BY
Thos. H. Brown
HIS ATTORNEY Patented July 6, 1926.

1,591,174

UNITED STATES PATENT OFFICE.

ROY D. MAILEY, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

JOINTURE MEANS.

Application filed December 7, 1923. Serial No. 679,281.

The present invention relates to air tight joints between walls of material such as metal, or metal and vitreous material, useful in the arts generally and particularly in the art of gas and liquid treating and sterilizing.

The purpose of this invention is to provide an air-tight joint, for example, between vitreous material and metal that will allow and compensate for differences in expansion and contraction of similar or of different wall materials due to differences in co-efficients of expansion or to differences in temperature or to both or to mechanical strains met with in service.

This device is particularly applicable to chambers in which chemical, physical, or biological reactions are carried on either at, above, or below atmospheric pressure. A fused quartz tube could be used for instance as the central tube of a hollow annular vessel and an ultra violet lamp be suspended within this tube. This tube would allow the passage of ultra violet rays into the reaction chamber to catalyze chemical changes.

This device is applicable to a number of forms of reaction chambers such as shown in Figs. 4, 5 and 6.

Figure 4 is a vertical section of a cubical chamber having a window of fused quartz secured over an opening therein by a simple embodiment of my new joint structure.

Figure 5 is a vertical section of a cylindrical reaction chamber showing the application of this invention to a fused quartz wall connected between two fluid conveying pipes, and Figure 6 is a similar view of a modified form of cylindrical reaction chamber having two metal heads held to a vitreous cylinder.

Figure 1:
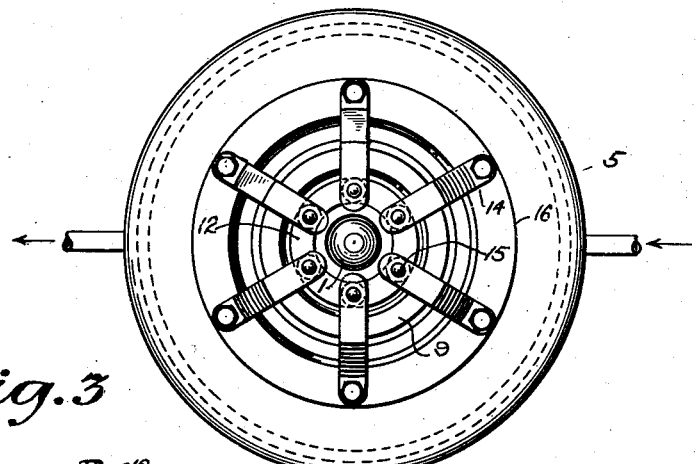
Figure 1 is a plan view of a sterilizer for liquids showing the application thereto of my new joint structure.

Referring to the drawings one application of this invention would be to a sterilizer for water or other liquids or fluids such as is shown in Figure 1 in which ultra violet light is used to sterilize the liquid. The ultra violet arc lamp 1 is suspended within the fused quartz tube 2 which forms part of the water chamber 3. The outside of the chamber consists of the metal pipe or tube 4 and the metal end caps 5 and 6 which are joined in some suitable manner. Between the silica tube 2 and the end cap 6 is a soft gasket 7 such as lead, copper, rubber, fabric, impregnated packing, or other suitable material to meet service conditions of the device, said gasket being positioned in the annular groove 8 formed in the cap. At the other end of the sterilizer connection is made between the cap 5 and the tube 2 through a flexible diaphragm 9 to form a joint which will allow contraction and expansion in different parts without breaking the joint. The contact is made with tube 2 with a ring 10. And contact is kept secure at this point by means of the springs 13.

Figure 2:
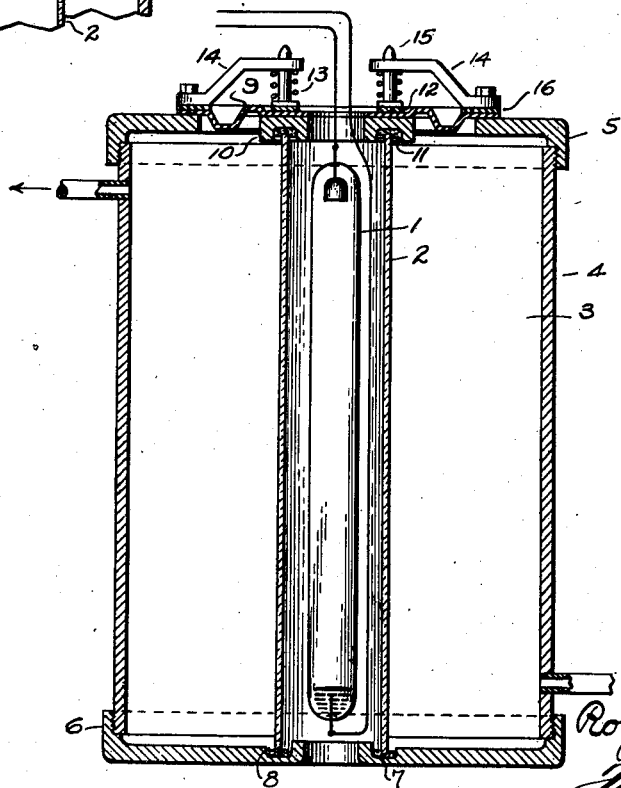
Figure 2 is a vertical mid-section of the device of Figure 1 showing the details of the joint structure.

The details of this joint are shown in Fig. 2 in which the flexible diaphragm 9 connects the cap 5 to the grooved ring 10. The lead gasket 11 in an annular groove formed in 10 serves to form a tight joint between the ring 10 and the tube 2. The diaphragm 9 is held firmly against the top of the cap 5 by means of the ring 16 against which the braces 14 are bolted. Through the inner ends of braces 14 pass the pins 15 which are forced against the diaphragm by means of springs 13 which are mounted thereon and which bear against the bottom of the braces 14. Between the lower ends of the pins 15 and the diaphragm 9 is interposed the stiff ring 12 which serves to distribute the pressure uniformly and back of the annular ring 10 and thus to the quartz tube.

It will be seen from the above description and the drawings that any inequality of expansion in the vitreous tube 2 and the metal parts will be compensated for by the flexibility of the springs 13 which will compensate not only for unequal expansions of the different materials but also for uneven expansion in any part such as might occur, for instance, as a result of a change of temperature of a liquid flowing in the chamber 3. It will also be seen that any changes occuring cannot be transmitted from the outer part of the chamber to the inner or vice versa due to the fact that the diaphragm 9 will take up any movement transmitted to it and that the integrity of the seal will be maintained.

Figure 3:
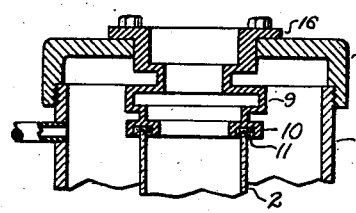
Figure 3 is a vertical section of a simple joint structure wherein the resiliency of the diaphragm alone is availed of to maintain the necessary tension of the joined walls embodying my invention.

Figure 3 shows another adaptation of this invention in which the flexibility of the corrugated diaphragm 9 is utilized to secure and maintain flexible contact between the cap ring 5 and the fused quartz tube 2. In this embodiment I have shown the diaphragm 9 as being cylindrical rather than disc shaped and have also shown the rings 10 and 16 as being integral with the diaphragm. The diaphragm of this form as well as the disc diaphragm of Figs. 1 and 2 may be mounted upon frames of sheet metal to give a structure having both strength and flexibility.

Figure 4 shows a section of a box shaped reaction chamber, 17, having a window, 18, of fused quartz glass which is seated on the gasket, 19. The springs, 13, which are mounted on the pins, 15, and which bear on the feet thereof serve to resiliently hold the window, 18, against the wall of the chamber, and the braces, 14, through which the pins, 15, freely pass serve to hold the pins and the springs in place. The flexibility of the springs 13 in this and the other embodiments of my invention may be adjusted by means of threaded nuts mounted on the studs 15 between the springs 13 and the braces 14.

Figure 5 shows, in section, two conduits 20 having elbow bends and having flanges 21 between which is seated the fused quartz tube 22 to form a reaction chamber. The two flanges are resiliently clamped against the ends of the chamber tube by means of bolts 23 springs 15 and nuts 24. The annular channels 25 fixed to the inner sides of the flanges carry soft gaskets 11 which serve to seat the ends of the tube 22 to produce air tight connection therebetween.

Figure 6 is a sectional view of a reaction chamber formed by the length of fused quartz glass piping 22 and the two heads 26 in which are annular grooves 8 in which the ends of the tube 22 are seated on the soft gaskets 11. Resilient air tight connection is secured between the tube and the heads by means of the bolts 23 springs 15 and the nuts 24.

It will also be seen, of course, that this device is capable of several variations in form to suit convenience of manufacture such for instance as the making of ring 16 and the braces 14 unitary, the making of ring 12 and pins 15 unitary, the diaphragm 9 and ring 10 unitary, etc. I, therefore, do not wish to limit this invention to the exact form or application shown or described herein.

I claim as my invention:

1. In a flexible joint between two members having different expansions, in combination, a flexible diaphragm, means for securely holding said diaphragm against one of said members, and flexible means for holding said diaphragm securely against the other of said members.

2. In a treating chamber, in combination, a two-part chamber wall, one of which parts has a different thermal coefficient of expansion from the other, a resilient packing means intermediate said parts, and resilient means for holding said resilient packing in air tight packing relation to said walls during relative movement of said wall parts either toward or away from each other.

3. In a reaction chamber for use with ultra-violet light, in combination, a two part chamber wall, one of which parts is of fused quartz, an air tight packing between said wall parts, and resilient means for holding said packing in air tight packing position between said wall parts during relative movement of said wall parts either toward or away from each other.

4. In a reaction chamber comprising an outer metal casing, annular metal caps at each end of said casing and an inner tube of fused quartz, in combination, a flexible circumferential diaphragm, connecting the inner circumference of one of said caps with the quartz tube.

5. In a reaction chamber comprising an outer metal casing, annular metal caps at each end of said casing, and an inner tube having one end seated in one of said annular caps, in combination, a circumferential diaphragm connecting the other end of said inner tube to the other one of said annular caps.

6. In a reaction chamber comprising an outer metal casing, annular metal caps at each end of said casing, and an inner tube having one end seated in a lead gasket in one of said caps, in combination, a metal annulus having a lead gasket seated on the other end of said inner tube, an annular diaphragm of corrugated metal connecting said metal annulus and the other of said caps, resilient means for firmly holding said diaphragm against said metal annulus, and means for firmly holding said diaphragm against said cap.

7. In a treating chamber an outer casing, an inner casing of fused quartz concentric therewith, a cap for one end of said chamber connected to said outer casing and having a soft gasket in which said inner casing is seated, an inwardly flanged cap ring connected to the other end of said outer casing, an inner ring having a soft gasket seated on the other end of said inner casing, an annular flexible diaphragm seated contiguous to its outer edge on the inwardly extending flange of said first ring and seated contiguous to its inner edge on said second ring, outer and inner seating rings on said diaphragm near said edges, means for firmly holding said outer seating ring to clamp the outer edge of said diaphragm against said ring and for resiliently holding said inner seating ring to clamp the inner edge of said diaphragm against said inner ring, and inlet and outlet connections to said chambers.

Signed at Hoboken in the county of Hudson and State of New Jersey this 6th day of December, A. D. 1923.

ROY D. MAILEY.